United States Patent
Haupt

(10) Patent No.: US 6,832,128 B2
(45) Date of Patent: Dec. 14, 2004

(54) METHOD FOR RENDERING, EVALUATING AND OPTIMIZING A SURFACE QUALITY BASED ON CNC PROGRAM DATA

(75) Inventor: Alexander Haupt, Frankenwinheim (DE)

(73) Assignee: Siemens Aktiengesellschaft, München (DE)

( * ) Notice: Subject to any disclaimer, the term of this patent is extended or adjusted under 35 U.S.C. 154(b) by 98 days.

(21) Appl. No.: 10/304,547

(22) Filed: Nov. 26, 2002

(65) Prior Publication Data

US 2003/0171840 A1 Sep. 11, 2003

(30) Foreign Application Priority Data

Nov. 26, 2001 (DE) .......................................... 101 57 964

(51) Int. Cl.[7] .............................................. G06F 17/50
(52) U.S. Cl. ...................... 700/184; 700/110; 700/160; 700/173; 703/1
(58) Field of Search .............................. 700/87, 98, 110, 700/109, 160, 173, 180–184, 187, 189; 703/1, 7; 345/964

(56) References Cited

U.S. PATENT DOCUMENTS

| | | | | |
|---|---|---|---|---|
| 4,646,228 A | * | 2/1987 | Ikeda ........................... | 700/87 |
| 4,945,487 A | | 7/1990 | Kimura et al. ............... | 700/160 |
| 5,627,771 A | * | 5/1997 | Makino ........................ | 702/155 |
| 5,691,909 A | * | 11/1997 | Frey et al. .................... | 700/159 |
| 6,038,335 A | * | 3/2000 | Yokoyama et al. .......... | 382/141 |
| 6,167,325 A | * | 12/2000 | Kamiguchi et al. .......... | 700/183 |
| 6,256,038 B1 | * | 7/2001 | Krishnamurthy ............ | 345/419 |
| 2002/0002420 A1 | * | 1/2002 | Hirai et al. ................... | 700/187 |
| 2003/0065487 A1 | * | 4/2003 | Rosel et al. ................... | 703/1 |
| 2004/0070585 A1 | * | 4/2004 | Papiernik et al. ........... | 345/420 |

FOREIGN PATENT DOCUMENTS

| | | |
|---|---|---|
| EP | 02 76 312 | 8/1988 |
| EP | 0 335 984 | 10/1989 |
| EP | 1 176 482 | 1/2002 |
| WO | WO 01/31885 | 5/2001 |

OTHER PUBLICATIONS

Czerwinski et al.: "An Architecture for a Secure Service Discovery Service", in: Mobicom '99, vol. Conf. 5, New York, Aug. 15, 1999, pp. 24–27.

Nusser et al.: "Reality–driven Visualization of Automation Systenms via the Internet Based on Java and XML", in: Proceedings Volume from the IFAC Conference, Weingarten, Germany, Jul. 24–26, 2001, pp. 497–502.

* cited by examiner

*Primary Examiner*—Leo Picard
*Assistant Examiner*—Paul Rodriguez
(74) *Attorney, Agent, or Firm*—Henry M. Feiereisen

(57) ABSTRACT

The invention is directed to rendering a three-dimensional view of a workpiece shape based on a point set using a normal vector representation. The distribution of the normal vectors can be analyzed by a centered view of the normal vectors, which can be done manually and/or automatically. These structures give a first indication of the surface quality. In addition to the centered representation, the normal vectors can also be directly overlaid on the path, which facilitates the determination of local flaws. In addition, a pseudo-surface view can be generated based on the position of the normal vectors.

25 Claims, 14 Drawing Sheets

- ● Original point
- ◎ 1μm error
- ←→ 1μm

— Spline curve
● Original points
◐ Spline-smoothed points

METHOD FOR RENDERING, EVALUATING AND OPTIMIZING A SURFACE QUALITY BASED ON CNC PROGRAM DATA

CROSS-REFERENCES TO RELATED APPLICATIONS

This application claims the priority of German Patent Application, Serial No. 101 57 964.0, filed Nov. 26, 2001, pursuant to 35 U.S.C. 119(a)–(d), the disclosure of which is incorporated herein by reference.

BACKGROUND OF THE INVENTION

The present invention relates to a method for rendering and/or evaluating a surface quality of a workpiece based on program data used for machining. These program data include a set of points describing the surface, wherein the set of points describes points along the path of space curves. The invention also relates to a method for optimizing the surface quality.

High-speed machining or high-speed cutting (HCS) has recently become more widespread in milling operations. The development of new technologies, such as high frequency spindles, modern cutting materials and highly dynamical, digital feed drives in numerically controlled machine tools and robots has resulted in increased use of HSC machining.

In particular, the construction of tools and molds has experienced significant advantages, such as reduced machining time, lower machining costs and shorter throughput times as compared to conventional machining of materials.

The high precision of HSC installations can also eliminate the need for manual finishing, in particular when free-form surfaces are milled.

The free-form surfaces are typically curved three-dimensional surfaces, for example fenders of an automobile or turbine blades. When these workpieces are milled, a very high measurement accuracy and surface quality is generally required.

However, the HSC method can also cause problems in certain applications. For example, in the construction of molds, the surface quality may no longer be guaranteed due to unpredictable errors. The precise, highly dynamical drives of the HSC machines appear to cause more errors than conventional drives.

The underlying cause could be determined quickly by comparing two workpieces milled on different machines. The machine that produces a poor surface quality would then be responsible for generating the machining errors. Such behavior, however, can generally not be determined. There are obviously certain factors which are influenced by different data processing or construction of these machines.

Older, less dynamic drives react rather sluggishly to the (drive) control input variables. This smoothes out small irregularities or flaws of the control input variables. As a result, rather soft, homogeneous surface structures are obtained which, however, may have greater measurement tolerances (smoothing).

However, a HSC machining process with its precise, highly dynamic drives can transfer the control variables more exactly. Smaller flaws which were previously smoothed out then become increasingly visible. Rough, inhomogeneous (hard outlined) surface structures are the result.

This processing method can achieve a higher accuracy at the expense of sometimes unacceptable surface quality.

The present invention combines the advantages of HSC machining with the high quality of conventional machining. This is accomplished by determining the underlying causes for the inadequate quality of HSC machining and by proposing improvements.

The path from a virtual model to the milled workpiece will hereafter be described into form of a process chain. This process chain is a linear sequence of individual decoupled process steps. It is therefore necessary to determine the causes for the inadequate surface quality across the entire process chain.

The process chain can be subdivided into four larger main areas. FIG. 2 shows such a simplified process chain.

Three well-defined points (CAD model, NC data, control variables) exist within the process chain. The analysis of the NC input data (NC program) is an object of the present invention.

Except for a few special cases, the process chain depicted in FIG. 2 with the processing paths (CAD construction→NC controller→Machine Drives) is presently almost exclusively used. Processing is typically preformed using linear sets. However, several manufacturers of control systems have since several years been able to process spline-based workpiece models without prior conversion into linear sets. In the future, the conversion could be eliminated entirely (by processing the CAD data without converting them first in the NC controller). Since an intermediate step is eliminated or at least significantly simplified, possible conversion errors are also reduced. However, until then, conventional processing methods will most likely be used to ensure compatibility.

The surface quality can be improved by intentionally intervening in the control variables. However, this intervention either prolongs machining times or replaces the old errors with new errors. Moreover, optimizing the control variables is quite costly due to the complexity of the control path. An analysis of the NC input data (workpiece data) is therefore a next step for reducing errors. Recognizing the errors is a first step in their elimination.

Until now, surface quality has been rendered by providing a surface grid of the set of points describing the surface and by then evaluating the rendition. This rendition view, however, provides only a limited view of the surface quality, because it is difficult to recognize the large number of the surface quality features of complex CNC program data.

It would therefore be desirable and advantageous to provide an improved process, which obviates prior art shortcomings and which can be used to analyze the surface quality of a workpiece, that is still to be manufactured, based on CNC program data before the workpiece is actually machined, and to thereby quickly and easily recognize possible error locations or in accuracies. In addition, an effective method for visualizing the determined surface quality should also be provided.

SUMMARY OF THE INVENTION

According to one aspect of the present invention, a method for rendering and/or evaluating the surface quality of a workpiece based on program data used for machining includes determining and rendering the associated normal vectors for a plurality of adjacent points along the machining path, wherein regions with a high surface quality are indicated by normal vectors that are oriented essentially in the same direction, whereas flaws in the resulting surface are indicated by normal vectors pointing in different directions.

Such normal vectors are preferably determined by forming two vectors from three consecutive path points and arranging the normal vector of a center path point as a vector product perpendicular on a plane spanned by the two vectors, whereby the orientation of the normal vector relative to a side of the plane is selected depending on the direction of curvature of the space curve at the corresponding path point.

According to another feature of the present invention, so-called angle-bisecting vectors can be employed instead of the normal vectors. The corresponding angle-bisecting vectors are determined and rendered for a plurality of adjacent path points. Regions with a high surface quality are indicated by angle-bisecting vectors pointing essentially in the same direction, whereas flaws in the resulting surface are indicated by angle-bisecting vectors pointing in different directions. Preferably, such angle-bisecting vectors can be determined by forming two vectors from three consecutive path points and arranging the normal vector of a center path point as a vector product perpendicular on a plane spanned by the two vectors, and by rotating the normal vector into the plane by an angle of 90°, so that the angle-bisecting vector is located at half the angle between the two vectors.

According to another feature of the present invention, all determined normal vectors of the path points may be rendered with their center located at one point. Conclusions regarding the surface quality can be drawn based on the distribution of the normal vectors, in that regions of high surface quality are indicated by the essentially overlapping normal vectors, whereas flaws of the resulting surface are indicated by a scatter of the normal vectors in different directions.

Advantageously, the end points of the normal vectors having an identical length and being centered at an initial point are projected in three-dimensional space onto a spherical surface having the radius of the normal vector, and regions of flaws of the resulting surface are indicated by regions with a large number of such end points.

According to another feature of the invention, the angles between corresponding normal vectors of adjacent path point can be determined and regions with a high surface quality can be indicated by comparatively small angles between adjacent normal vectors, whereas flaws in the resulting surface quality are indicated by relatively large angles and/or sudden changes between adjacent angles. Suitably, a tolerance threshold can be defined which is advantageously selected between 10° and 25°. Angles between adjacent normal vectors below this threshold value are assumed to be small angles and angles above the threshold value are assumed to be comparatively large angles.

For effective visualization, the path points associated with adjacent normal vectors having comparatively large angles can be advantageously specially marked. Visualization of the analyzed surface quality can be improved further by the invention by rendering a normal vector in form of an extended surface that extends to one of the adjacent path points on one or both sides of the path axis along the path. The so produced pseudo-surfaces provide an observer with an improved view of the position of the normal vectors or the angle-bisecting vectors that are used for evaluating the surface quality. Visualization can be further improved by marking regions with flaws of the resulting surface by coloring the respective points or lines or surfaces.

In addition to analyzing the NC input data of exemplary freeform surfaces as described above, the present invention is able to not only recognize errors (mathematically analyzed and visualized), but also correct those errors.

This is achieved by a method for measuring and optimizing the surface quality by analyzing the surface according to the invention and manipulating the underlying CNC program data until most or all normal vectors or angle-bisecting vectors on the three-dimensional path point in the same direction. Suitably, the CNC program data can be manipulated by changing the original data points of the set. Alternatively or in addition, the CNC program data can also be manipulated by generating additional data points, in particular by performing a new scan of the three-dimensional path.

In particular, the original data points can be altered by smoothing the three-dimensional path, for example by a linear regression over several adjacent path points, as long as the space curve can be reduced on at least one plane. Alternatively, the three-dimensional path can be smoothed by a two-dimensional compensation spline extending over several adjacent path points.

Alternatively, the three-dimensional path can be smoothed by a three-dimensional compensation spline extending over several adjacent path points. Optionally, the data resolution of the path points of the space curve can be increased.

The present invention is able to realize the following advantages:

a very simple and clear rendition of possible error sources in parts programs possibility for a simple comparison between an original and an optimized parts program the effects of control components (e.g., a data compressor) on the path of a processing machine and therefore on the possible surface quality of a workpiece can be effectively viewed and compared based on the analyzed error sources and/or flaws, the CNC program data can be optimized automatically or manually after inspection by an operator.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

The depicted embodiments are to be understood as illustrative of the invention and not as limiting in any way.

To analyze and evaluate three-dimensional workpiece programs, the geometric properties of the NC data have to be evaluated. This is based mathematically on a conversion of the NC data into vector quantities, such as for example normal vectors.

The data in the NC programs for three-dimensional workpieces are stored as data triplets (X, Y and Z values). These data triplets represent a set of points describing the surface.

| Section of an NC program: | | | |
|---|---|---|---|
| N10 | X0.000 | Y-2.350 | Z23.569 |
| N20 | X5.000 | Z25.391 | |
| N30 | X9.560 | Y0.368 | Z33.624 |
| N40 | Y1.893 | Z48.657 | |

The number of following the letter "N" represents a sequential set number. When making molds, very smooth surface structures are desirable. This places certain preconditions on the controller and the NC data:

for example, speed along the path should be as constant as possible gentle acceleration only small changes in acceleration if possible, monotonous machining paths.

Helpful for analyzing the NC data is a representation of the milling paths by suitable vector quantities. Each data point is represented in a three-dimensional vector. The X, Y and Z values correspond to the scalar coordinates obtained from the NC database.

Many computations required that the distance between two adjacent points is determined. The distance between two points in a plane can be calculated using the Pythagorean theorem.

$$c^2 = a^2 + b^2, \quad (1)$$

$$a = x_{i+1} - x_i, \quad b = y_{i+1} - y_i. \quad (2)$$

Therefore, the distance between two points in the plane is:

$$s_{i,i+1} = |P_{i+1}(x,y) - P_i(x,y)| = \sqrt{(x_{i+1}-x_i)^2 + (y_{i+1}-y_i)^2} \quad (3)$$

The distance in three-dimensional space is as follows:

$$s_{i,i+1} = |P_{i+1}(x, y, z) - P_i(x, y, z)| \quad (4)$$

$$= \sqrt{(x_{i+1} - x_i)^2 + (y_{i+1} - y_i)^2 + (z_{i+1} - z_i)^2}.$$

A key component according to the invention for evaluating a data file is the normal vector, which is formed as a vector product between two linearly independent vectors. The normal vector is oriented perpendicular to a plane spanned by the two vectors.

Figure 4:
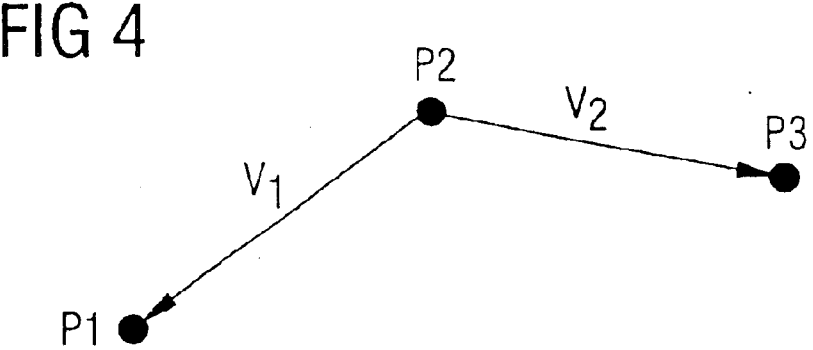
FIG. 4 shows schematically the formation of two vectors from three path points.

A normal vector is generated by first forming two vectors V1, V2 from three consecutive path points P1 . . . P3 (see FIG. 4).

The two vectors are multiplied according to the following equation (vector product):

$$\vec{N} = \begin{pmatrix} n_x \\ n_y \\ n_z \end{pmatrix} = \vec{A} \times \vec{B} = \begin{pmatrix} a_y b_z - a_z b_y \\ a_z b_x - a_x b_z \\ a_x b_y - a_y b_x \end{pmatrix} \quad (5)$$

$$\vec{N} = \vec{V}_i \times \vec{V}_{i+1} = (P_{i-1} - P_i) \times (P_{i+1} - P_i) \quad (6)$$

Figure 5:
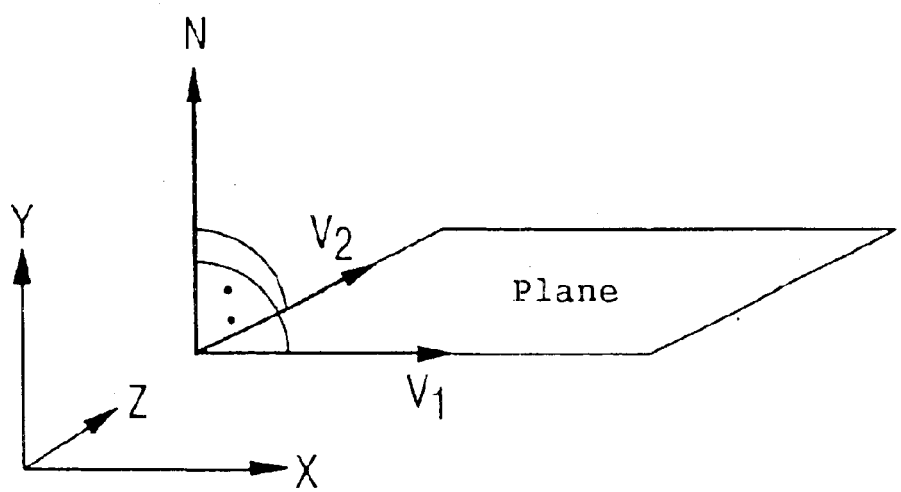
FIG. 5 shows the geometric determination of a normal vector.

FIG. 5 represents this association in a geometrical fashion. The direction of the determined normal vectors can be rotated by 180°, depending a left-handed or right-handed system is used. This mirror operation is inconsequential for the analytical methods, as long as a particular system is defined beforehand.

Figure 6:
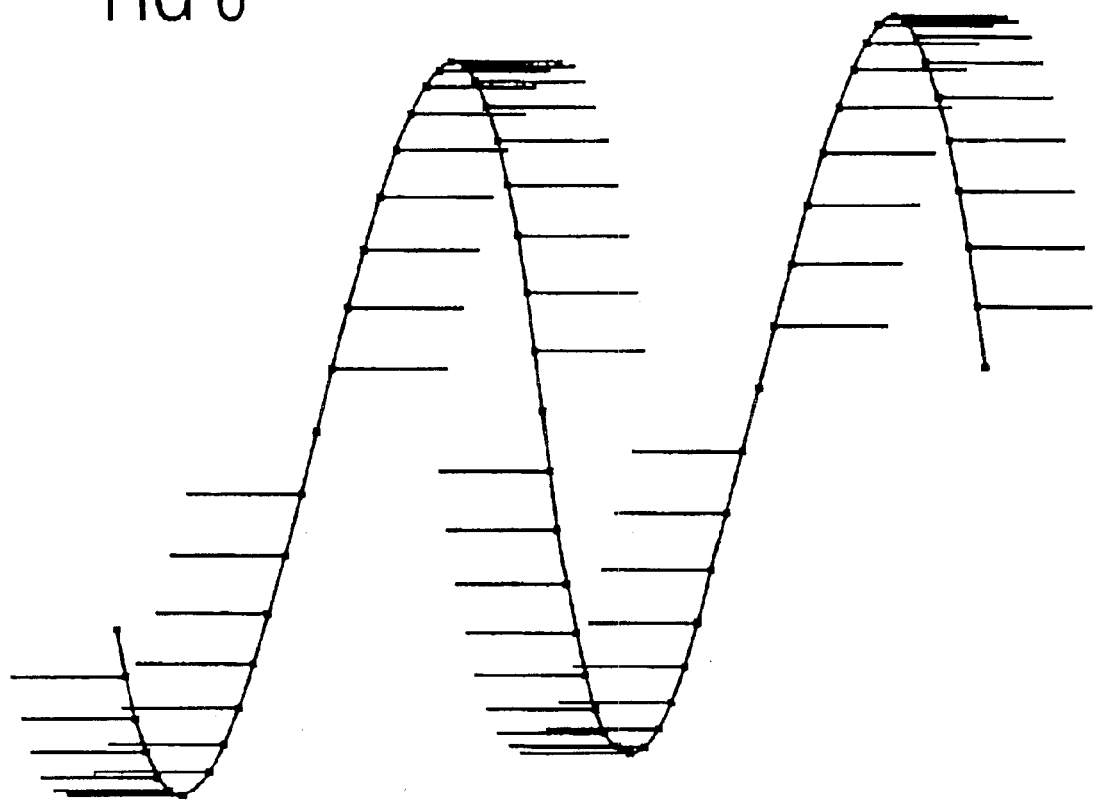
FIG. 6 shows a position of the normal vectors for an exemplary ideal three-dimensional sinusoidal curve formed of path points.

FIG. 6 describes the position of the normal vectors for an ideal three-dimensional sinusoidal curve composed of path points. The sinusoidal curve is represented by individual points. These points are connected by a line. Except for three exceptional situations, a normal vector can be associated with each point. Exceptional cases 1 and 2 are the beginning and end point of the curve, which do not have an associated normal vector. Exceptional case 3 relates to three points located on a straight line. The normal vector is herein not defined, because the vectors $\vec{V}_i$ and $\vec{V}_{i+1}$ are collinear (linearly dependent).

As indicated by the orientation of the vectors, this is a special case. The three-dimensional sinusoidal curve is obviously located in a plane. All normal vectors have the same orientation. The normal vectors are merely rotated by 180° depending on the direction of curvature of the curve.

When all normal vectors are collinear, then the set of points is located in a plane. Conversely:

if a set of points is to be located in a plane, then all normal vectors have to be collinear. Directional changes in the axial direction or in the path can be easily determined from the 180° jumps. These relationships which are important for the invention will be mentioned several times because of the fundamental significance of the normal vectors.

Figure 1:
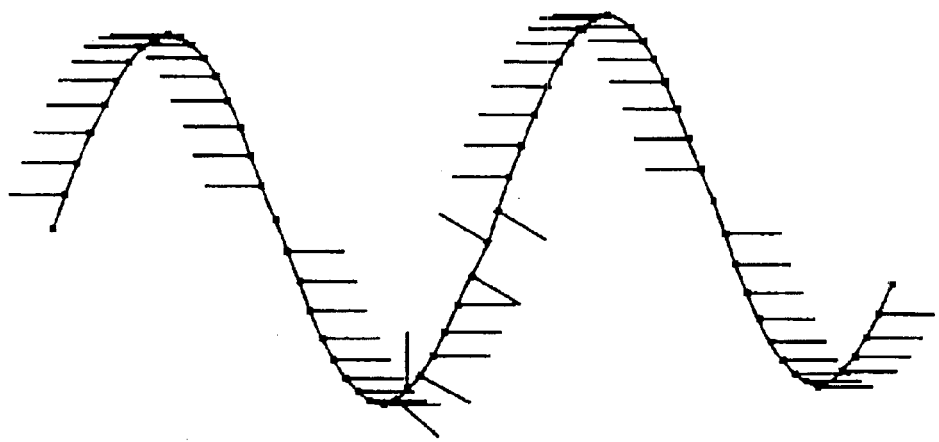
FIG. 1 shows a position of the normal vectors for an exemplary sinusoidal curve formed of three-dimensional path points.
Figure 2:
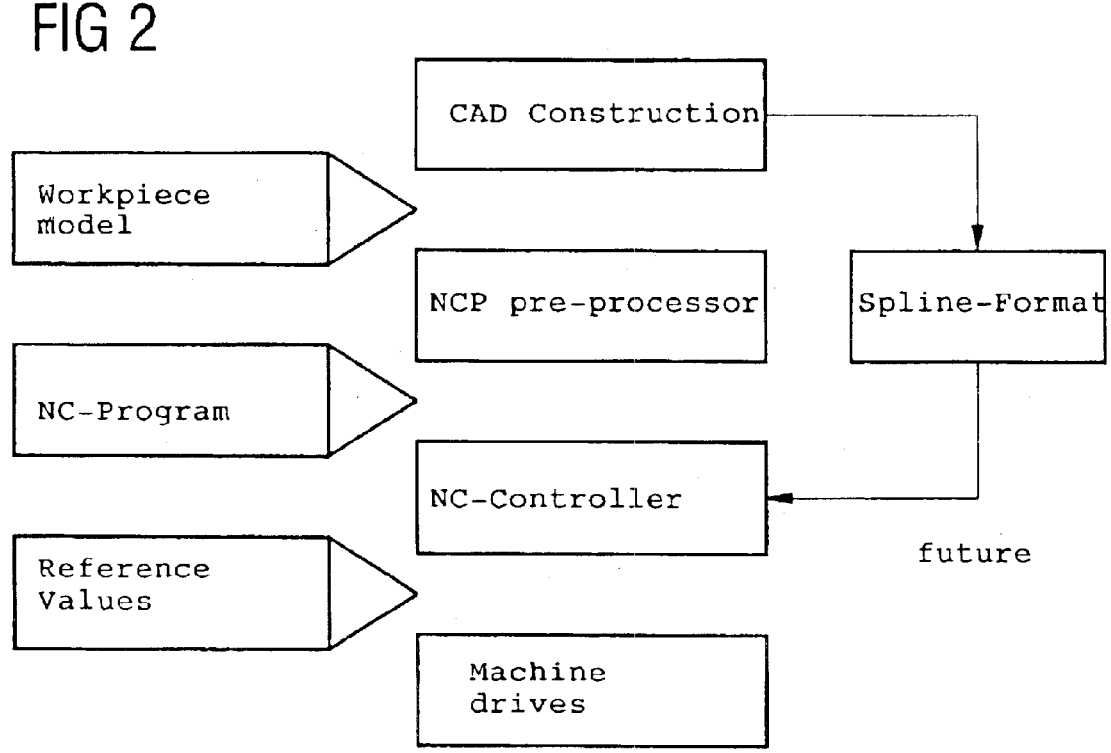
FIG. 2 shows a schematic diagram of a process chain with two processing paths.
Figure 3:
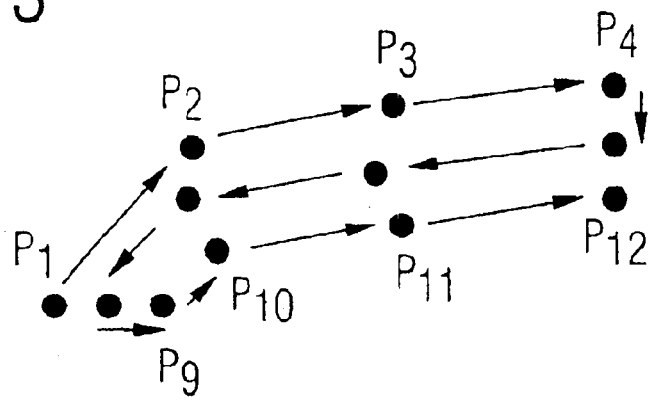
FIG. 3 illustrates a path with several path points.

In the following description based on FIG. 1, only two values of the sinusoidal curve are slightly changed. The resulting changes in the normal vectors are clearly visible in FIG. 1. The sinusoidal curve apparently has two points with errors. Since three points are required for determining a normal vector, three normal vectors are also influenced by a single point.

Figure 7:
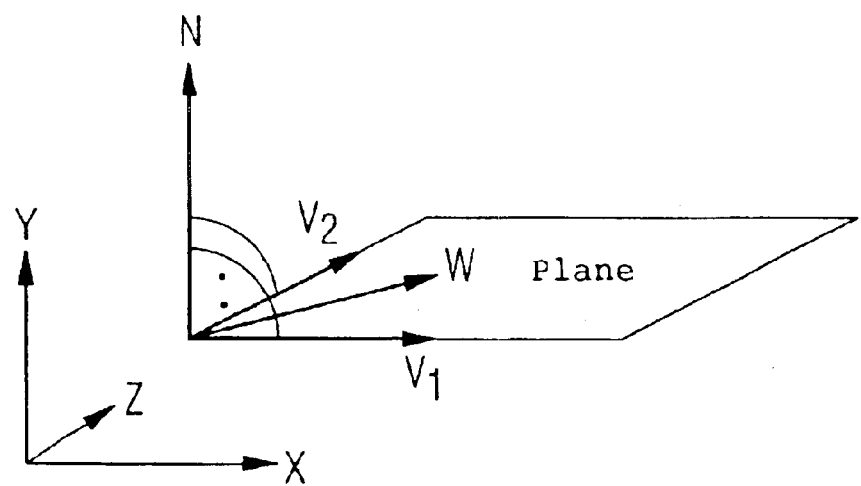
FIG. 7 shows the geometric determination of an angle-bisecting vector.

An alternative to the normal vectors are the so-called angle-bisecting vectors. An angle-bisecting vector W is a normal vector N that is rotated by 90°. The term "angle-bisecting" indicates that the vector lies at half the angle between the directional vectors. The vector is used to more quickly evaluate a curve visually, since the directional vector and the angle-bisecting vector lie in one plane. This situation is illustrated geometrically in FIG. 7.

Figure 8:
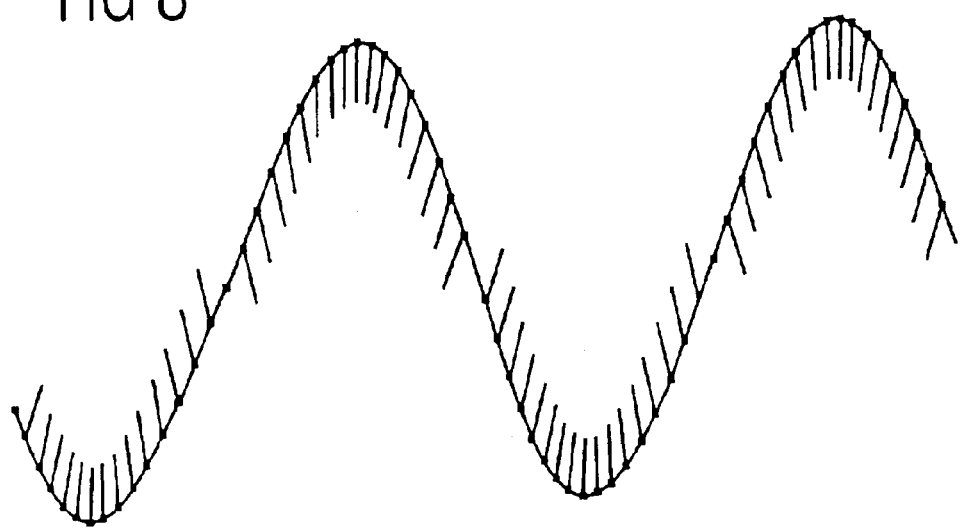
FIG. 8 shows a position of the angle-bisecting vectors for an exemplary ideal three-dimensional sinusoidal curve formed of path points.

Moreover, the curvature the curve can be more easily rendered, as readily seen from FIG. 8.

Calculations could be performed by rotating the normal vector by 90° into the plane of the direction vectors. The angle between two vectors can be calculated as follows:

$$\cos\varphi = \frac{\vec{A}_1 \cdot \vec{B}_2}{|\vec{A}_1| \cdot |\vec{B}_2|} = \frac{a_x b_x + a_y b_y + a_z b_z}{\sqrt{(a_x^2 + a_y^2 + a_z^2)(b_x^2 + b_y^2 + b_z^2)}} \quad (7)$$

Because only the direction and not the length of the vectors is a determining factor, the angle-bisecting vector is more easily obtained by a normalization.

Both direction vectors are normalized to a uniform length which in the simplest case are unit vectors. The angle-bisecting vector is obtained by subtracting the two unit vectors.

$$\vec{W} = \vec{e}_A - \vec{e}_B = \frac{\vec{A}}{|\vec{A}|} - \frac{\vec{B}}{|\vec{B}|} = \frac{\vec{A}}{\sqrt{a_x^2 + a_y^2 + a_z^2}} - \frac{\vec{B}}{\sqrt{b_x^2 + b_y^2 + b_z^2}} \quad (8)$$

If the set of points is located in a plane, then all angle-bisecting vectors are also in the plane. Unlike the normal vector, curve segments and angle-bisecting vectors lie in one plane.

FIG. 8 depicts the position of the angle-bisecting vectors of a sinusoidal curve in three-dimensional space. Clearly visible is the orientation of the vectors in the direction of the corresponding curvature of the curve.

Figure 9:
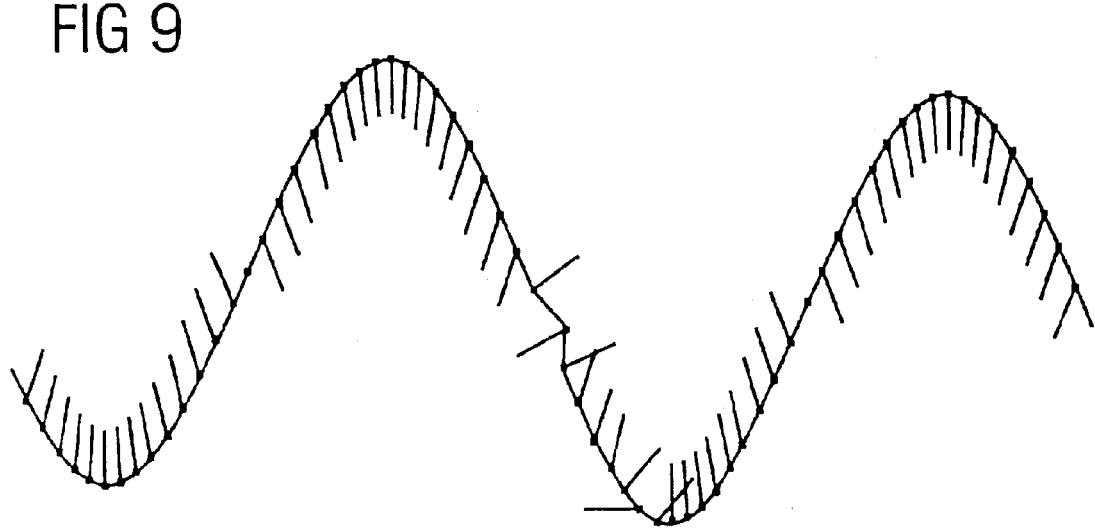
FIG. 9 shows a position of the angle-bisecting vectors for an exemplary three-dimensional sinusoidal curve formed of path points with errors.

FIG. 9 is identical to FIG. 8, except that two points have been altered. The affected vectors rotate out of the plane of the sinusoidal curve. The perspective view makes these vectors appear longer. However, all vectors have a unit length.

The angle-bisecting vectors are the angle-bisecting lines between the two path vectors. They correspond to the normal vectors rotated by 90°, but are located in the path plane. There position more clearly indicates the jitter in the path plane. The intermediate vectors are always in the plane spanned by the two vectors. The sinusoidal curve itself is also located in a plane, so that all intermediate vectors lie in a common plane. If the path has errors, then several intermediate vectors rotate out of the plane and can very easily be detected graphically (more clearly than normal vectors).

Figure 10:
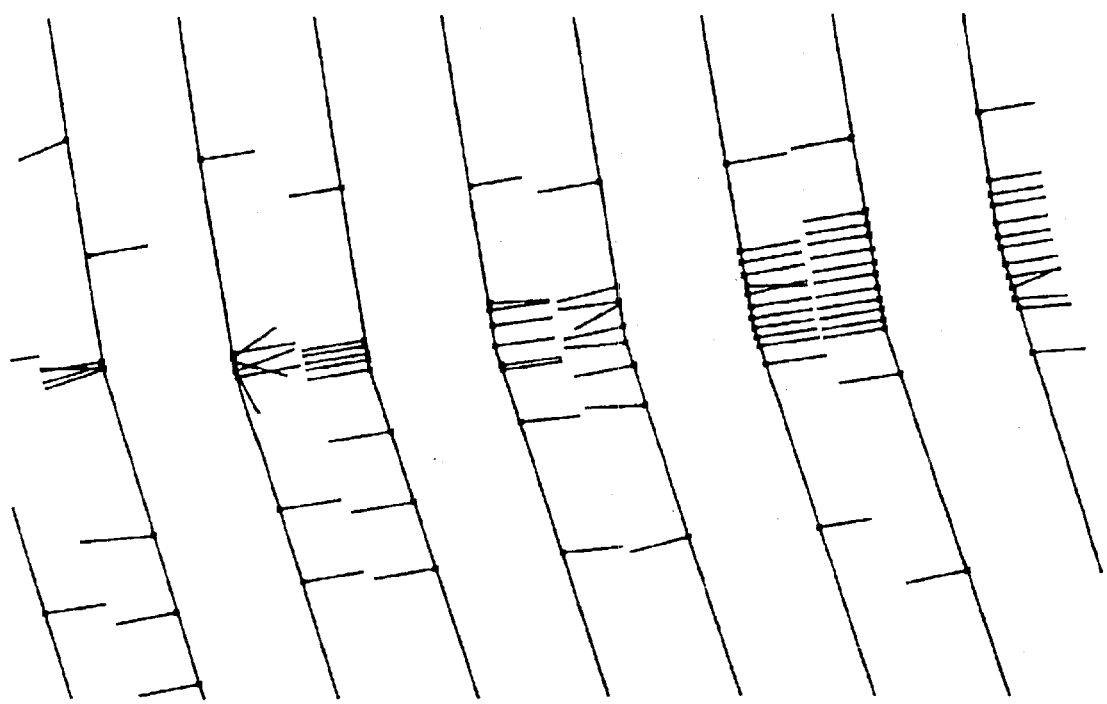
FIG. 10 shows an exemplary processing path with the determined normal vectors.
Figure 11:
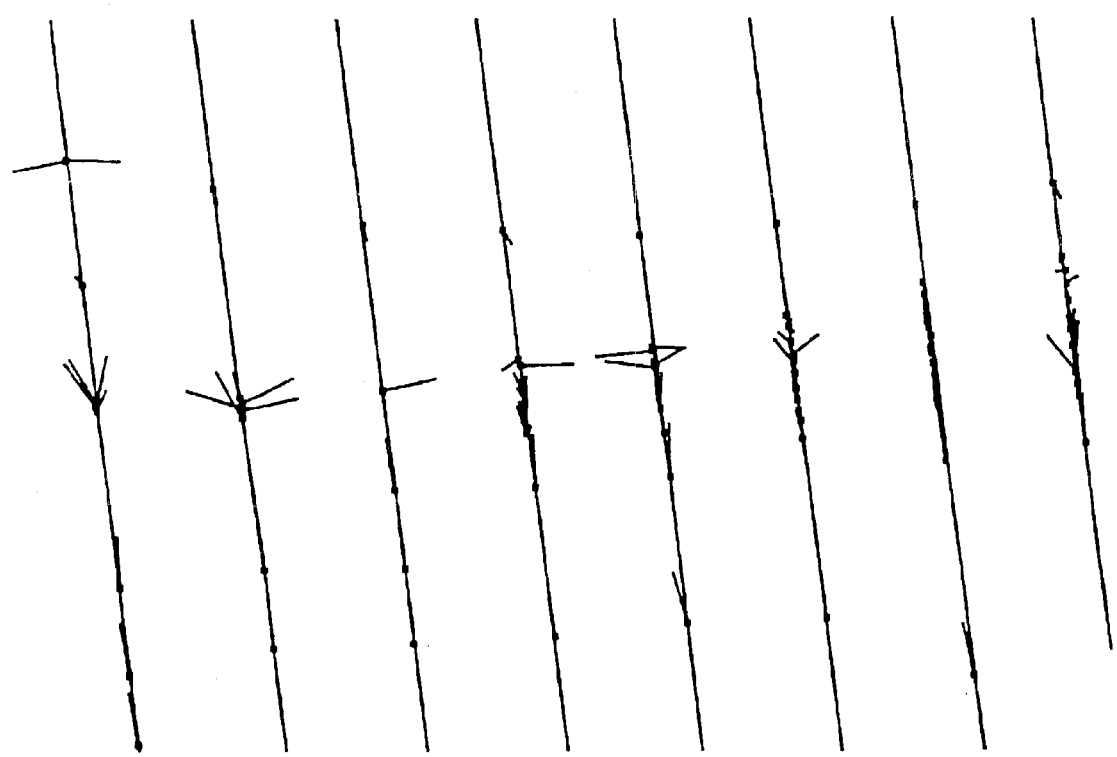
FIG. 11 shows the same processing path as in FIG. 10 with the determined angle-bisecting vectors.
Figure 12:
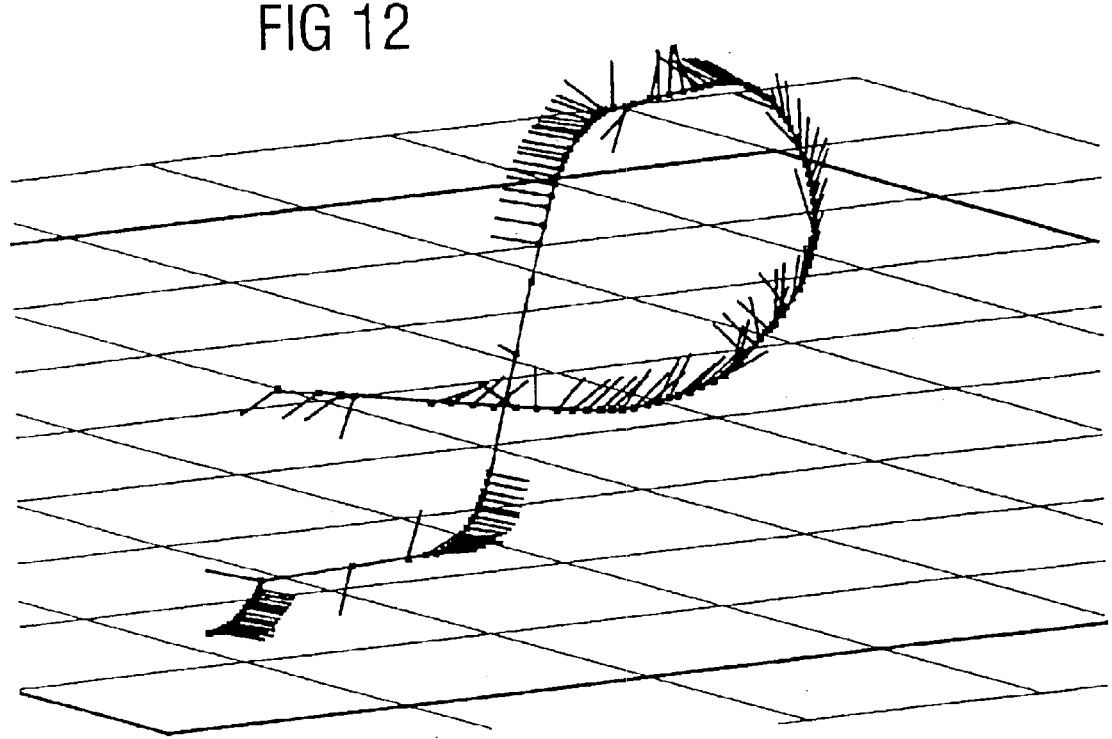
FIG. 12 shows an additional exemplary processing path with the determined normal vectors.
Figure 13:
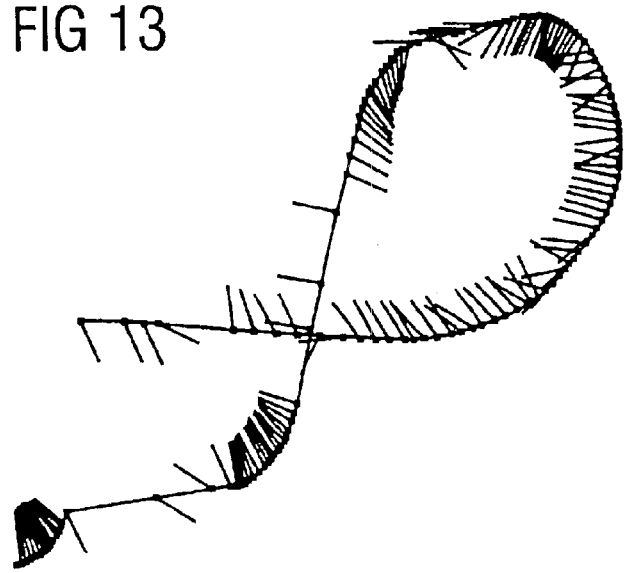
FIG. 13 shows the same processing path as in FIG. 12 with the determined angle-bisecting vectors.

The curvature of the path can be more easily determined by using the angle-bisecting vectors W, as illustrated by an exemplary graphic comparison of normal vectors and angle-bisecting vectors in FIG. 10 (normal vectors) and FIG. 11 (angle-bisecting vectors) as well as in FIG. 12 (normal vectors) and FIG. 13 (angle-bisecting vectors).

The normal vectors can also be used to generate a particular type of surface.

Figure 14:
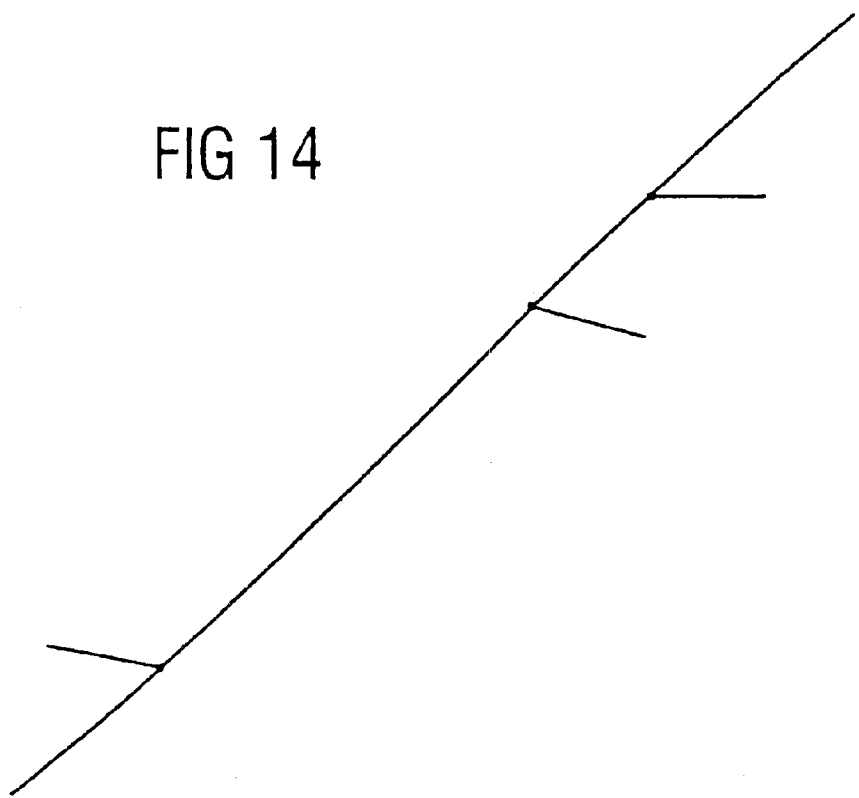
FIG. 14 shows a path segment with three points and three normal vectors.
Figure 15:
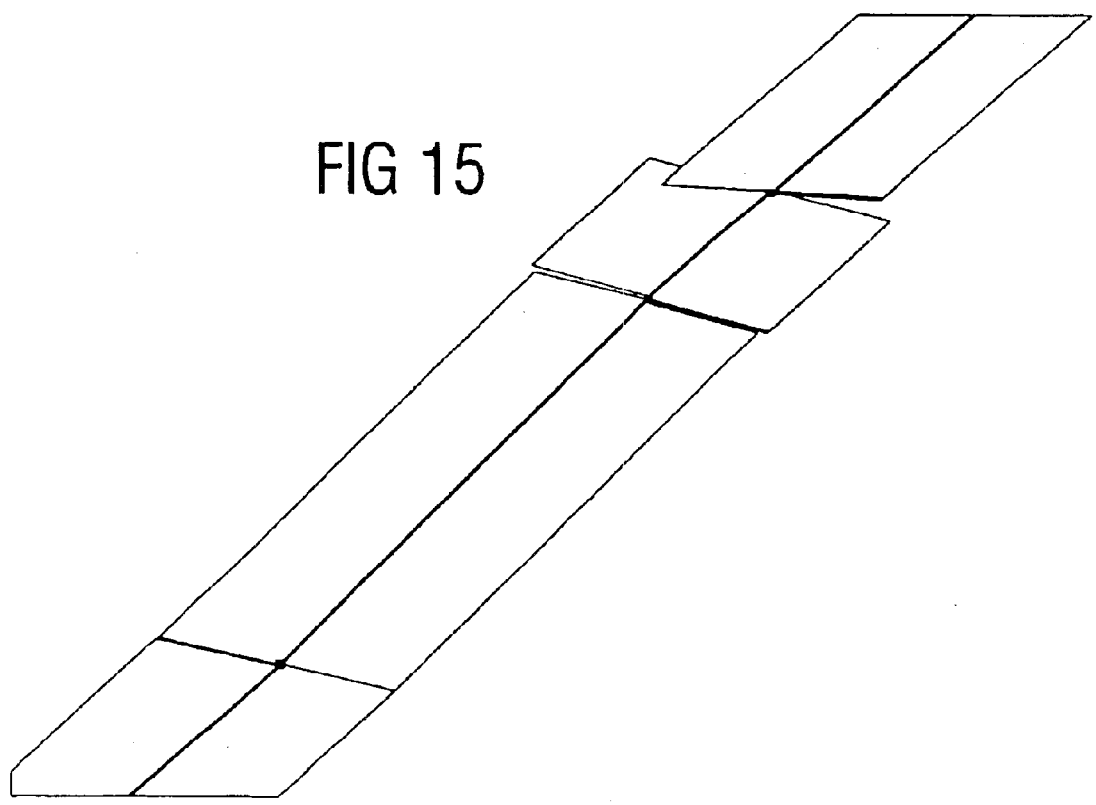
FIG. 15 shows the path segment with three points of FIG. 14 with a pseudo-surface rendition of the path, with darker or lighter shading depending on the position.

The normal vectors are hereby extended on both sides of the path axis, forming essentially an extended area to the next point along the path. The result is a small area segment along the path. FIG. 14 shows a path segment with three points and three normal vectors, whereas FIG. 15 shows a rendered pseudo-surface generated in this way, which can be colored darker or lighter depending on its location (not shown). This facilitates an optimal visualization of the surface quality.

The surfaces more clearly indicate the position of the normal vectors. In this way, all normal vectors of a large model can also be completely viewed (except for perspective occlusions). Conversely, a large number of normal vectors are difficult to compare solely based on a line rendition.

Figure 16:
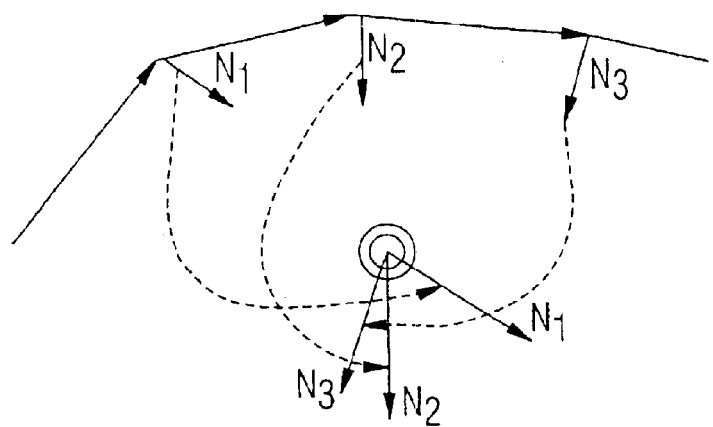
FIG. 16 illustrates the centering of three exemplary normal vectors.

Another very effective and extremely conclusive method for evaluating NC data is the centered rendition of the normal vectors. The normal vectors of all points are placed on a single origin and point into the space (FIG. 16 shows centering of three exemplary normal vectors N1 . . . N3). Centering at one point shows overlapping normal vectors as a single vector. In this way, nonconforming vectors that to do not point in the direction of the typical "good" normal vectors can be easily recognized.

Figure 17:
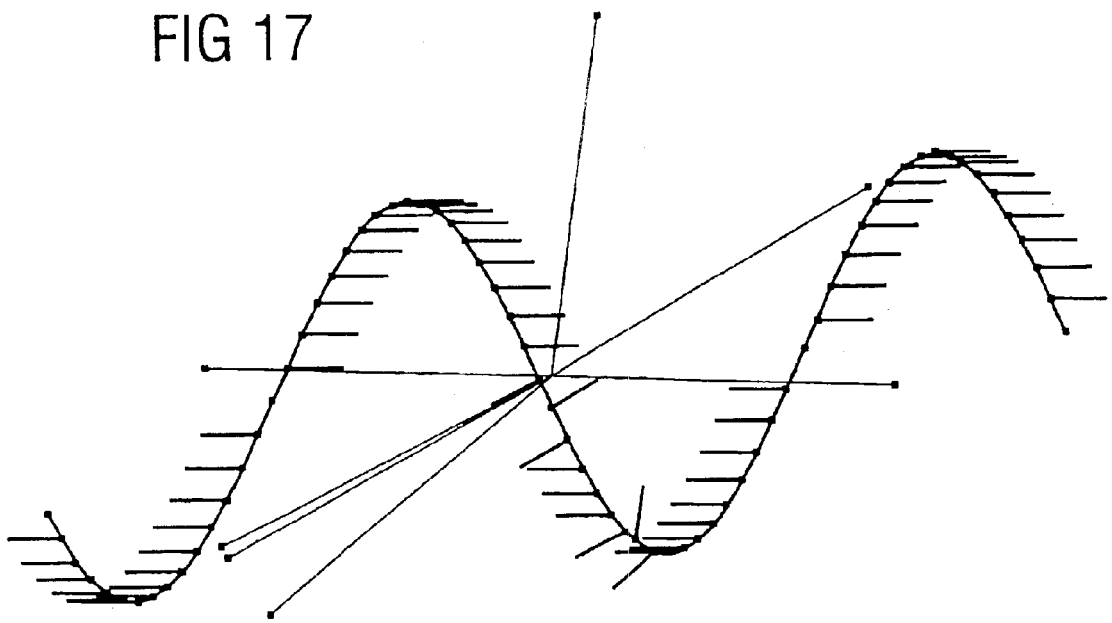
FIG. 17 shows the position of the normal vectors along the path and their centered rendition based on an exemplary three-dimensional sinusoidal curve formed of path points with errors.

FIG. 17 shows this approach based on a sinusoidal curve having errors composed of path points in three-dimensional space. A centered representation is illustrated in addition to the normal vectors. The distribution of the normal vectors permits conclusions about the accuracy of the data. This also enables an indirect evaluation of the data.

Since all normal vectors have the same length, all points are located on a sphere.

Figure 18:
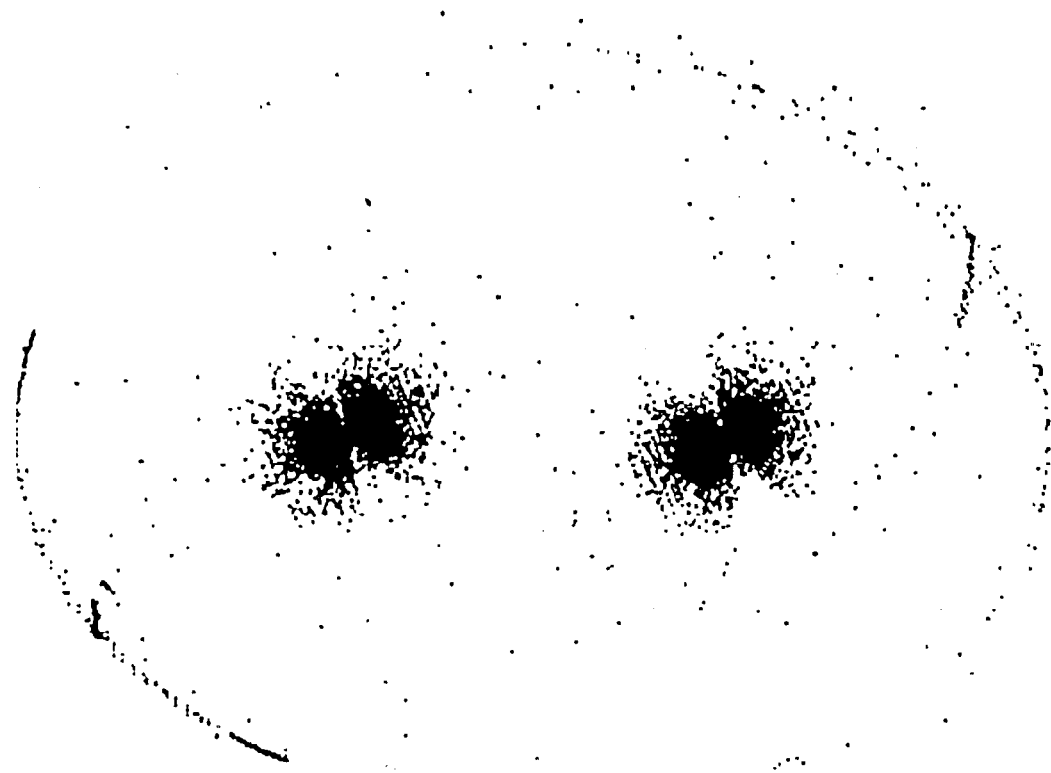
FIG. 18 shows the result of a centered rendition of normal vectors for an NC parts program, wherein some of the normal vectors have a large scatter.

FIG. 18 shows an exemplary graphic rendition of the result of the centered representation of normal vectors for an NC program, wherein all vectors have a significant scatter, as seen from the distinct clouds of points.

It summary, the following views of the normal vectors are possible in a centered representation:

the end points of the normal vectors lie on a spherical surface in three-dimensional space
the normal vectors are centered at one point in three-dimensional space and have unit length
a combined rendition of the two aforedescribed views.

These views can also be used to recognize islands and geometrical structures for a visual evaluation. Significant features of these views and their evaluation are summarized in the following table.

| Feature | Exact data | Imprecise/erroneous data |
| --- | --- | --- |
| Visible points | Few points visible, even with larger sets of points | Many points visible |
| Lines | Few points visible, many lines overlap | Many, less overlapping visible |
| Point distribution | Only small clouds of points visible | Pronounced clouds of points |
| Structures | Sharp structures with hard borders | Very few structures with sharp borders recognizable |
| Position | Tightly confined in space | Mostly widely distributed in space |

When the data are precise, only few points or lines may be visible. There are Input data showing no more than five points or lines, although the program has more than 150,000 data points. As already mentioned, only two normal vectors are visible, although the NC program has approximately 150,000 data points (and therefore also approximately 150,000 normal vectors). In an ideal case, the direction of the normal vectors is identical, so that all normal vectors are superpositioned, if the mirrored normal vectors are omitted.

The method of the invention can be used efficiently for evaluating CNC data files. Visualization allows ready conclusions about the quality of the input data.

Furthermore, the distribution can be analyzed statistically to determine a quality number.

A difficulty exists in that (aside from special cases) completely arbitrarily distributed structures are formed. The number of the points has also to be taken into consideration. There could be several hundred, but also several million points.

Smooth surfaces are obtained predominantly from data where the angle between two adjacent normal vectors is very small. This requires a high surface quality, since the direction of the adjacent normal vectors should only change slightly. A very poor surface quality can result from sudden changes.

To analyze this situation, another alternative method has been developed which, in addition, checks the angle between the normal vectors to determine to what extent to consecutive normal vectors are rotated with respect to one another. This indicates clearly if a path maintains the desired orientation or if the path oscillates.

Figure 19:
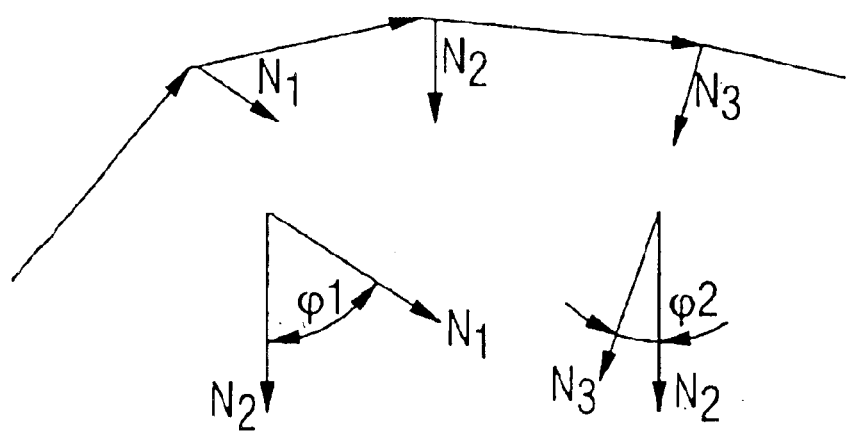
FIG. 19 shows the determination of an angular deviation between three exemplary normal vectors.

First, the angular deviation of all normal vectors with respect to the adjacent normal vectors is determined for all points. This is indicated in FIG. 19 graphically for three exemplary normal vectors N1 . . . N3 to show the angular deviation of the normal vectors.

In a second step, the angular deviations between the normal vectors exceeding certain tolerance measures (for example 20°) can be determined. The points defined by the normal vectors that satisfy this criterion are then preferably graphically accentuated.

This gives an overview over the path points whose normal vectors having a position that deviates strongly from that of the following normal vector. These regions overlay the irregular features of the workpiece surface. Corrective methods that diminish these deviations hence should also improve the surface quality.

Figure 20:
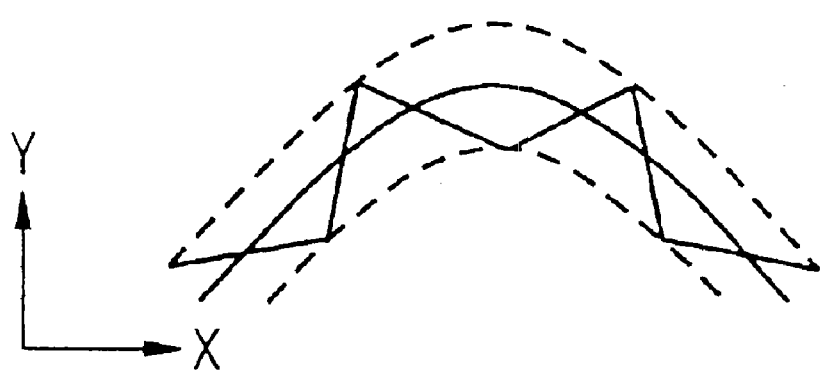
FIG. 20 shows an exemplary inferior path curve with a continuous change in the direction of curvature as indicated by alternating normal vectors.
Figure 20:
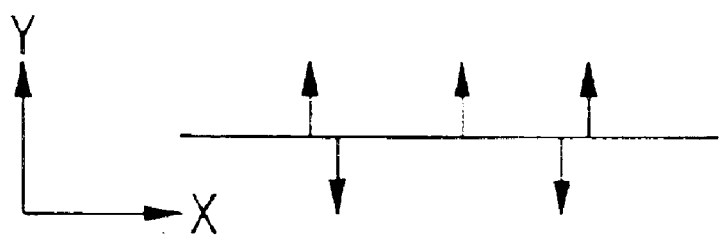

Conclusions about the path can be drawn based on specific patterns of normal vectors. Frequently, a pattern with alternating normal vectors is observed, wherein the following normal vector is rotated by 180° relative to the adjacent normal vector. FIG. 20 shows an exemplary inadequate path with a continuously changing curvature, as seen from alternating normal vectors. In the upper part of the figure, the actual curve with an alternating curvature and oscillations about an ideal path is shown in two-dimensions in the x-y direction. The associated normal vectors are indicated in x-z-direction, showing clearly a continuous directional change over a finite path segment.

This behavior is an indication of a continuous change in curvature. This can occur in particular with NC programs having a low resolution, since the path varies about its ideal line due to rounding errors ("saw-tooth curve").

According to the invention, such patterns can be recognized relatively easily by the angles of consecutive normal vectors. The additional illustration of the normal vectors in FIG. 20 shows the unusual path, whereby the curvature of the path segments changes continuously from point to point. The path oscillates about a path formed by the average values. Irregularities are observed on the workpiece surfaces at exactly these locations during milling. Elimination (correction) of such structures could increase the surface quality of the workpieces. This is achieved by manipulating the CNC program data so that all normal vectors point in the same direction.

In the following, possible causes for errors or flaws during CNC processing will be described, which may also suggest ways to optimize the CNC program data. Errors in the input data are in principle always possible due to the finite resolution (accuracy). The insufficient surface quality of the workpieces is caused in particular by the low resolution of the input data which is typically less than 1 $\mu$m. Many CAD systems supply data with at most 1 $\mu$m resolution, which can cause relatively large errors.

A small spacing between points with limited resolution can have a more serious effect of the path than a longer path length. The larger the spacing between points, the larger the percentage deviations from an ideal path.

Assuming, for example, a maximum resolution of 1 $\mu$m, then the smallest point spacing is also 1 $\mu$m.

| Spacing between points in $\mu$m | Angular offset in degrees between the ideal line and error line for a 1 $\mu$m error | Angular offset in degrees between the ideal line and error line for a 0.1 $\mu$m error |
| --- | --- | --- |
| 1 | 45 | 6 |
| 2 | 27 | 3 |
| 3 | 18 | 2 |
| 5 | 11 | 1 |
| 10 | 6 | 0.6 |
| 100 | 0.6 | 0.06 |

Figure 21:
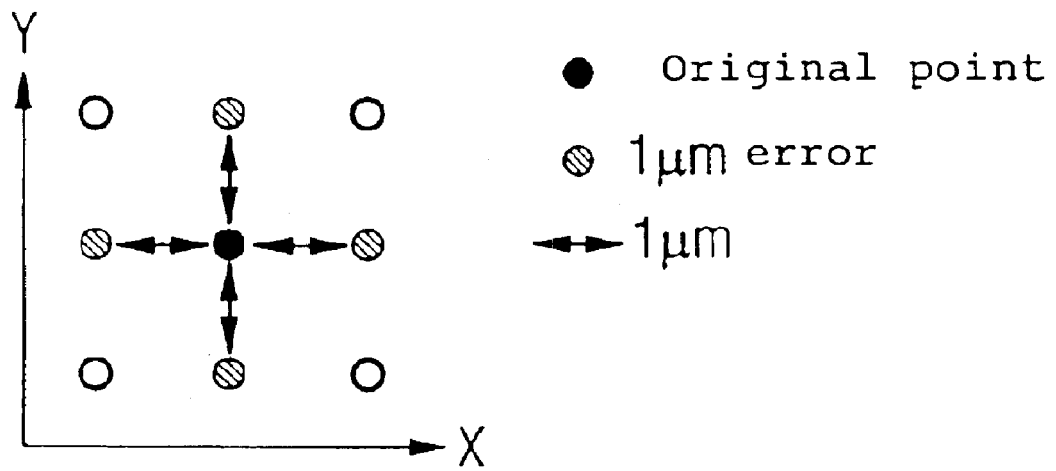
FIG. 21 shows an erroneous position of a point for fixed resolution and a maximum error of 1 $\mu$m.
Figure 22:
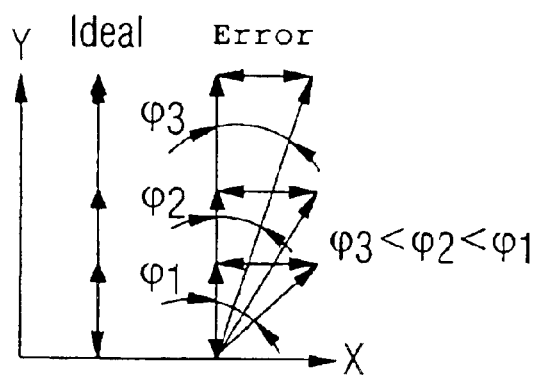
FIG. 22 shows a correlation between path length and fixed error.

FIG. 21 illustrates the erroneous position of a point with a fixed resolution and a maximum error of 1 $\mu$m. FIG. 22 illustrates the connection between the path length and the fixed error. The smaller the spacing between two points, the larger the effect of an error for a predetermined resolution. Since the goal is to minimize the error, the data resolution has to be a high is possible.

Figure 23:
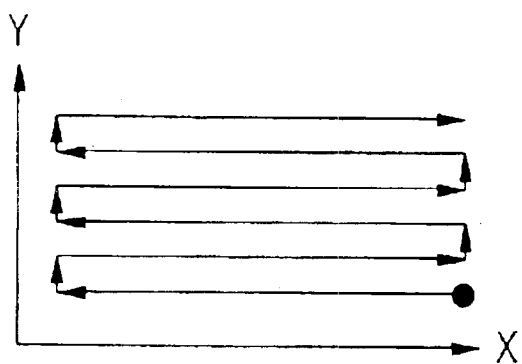
FIG. 23 shows an exemplary path in the xy-plane.
Figure 24:
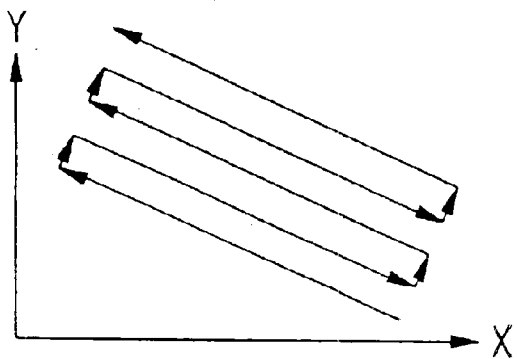
FIG. 24 shows an exemplary inclined path.
Figure 25:
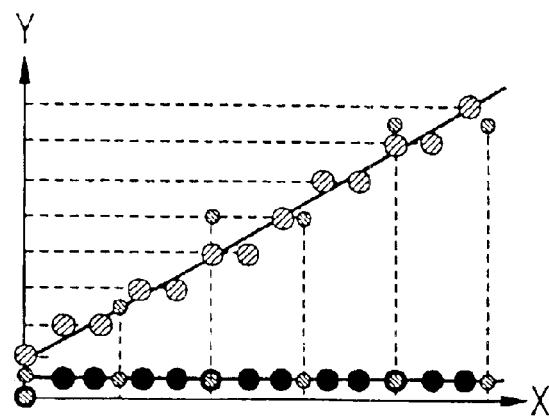
FIG. 25 is a point-wise rendition of the effects of insufficient resolution on inclined paths.
Figure 26:
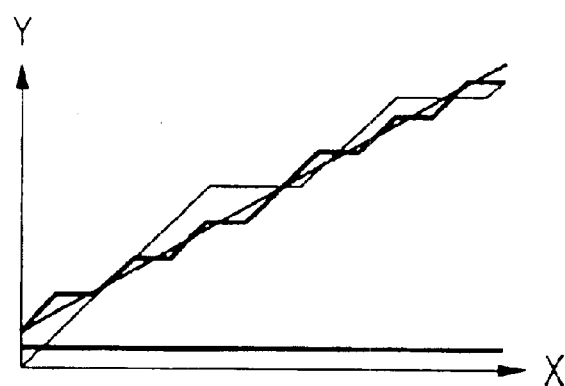
FIG. 26 is a line rendition of the effects of insufficient resolution on inclined paths.

The surface quality of the workpiece can be affected significantly by the selection of the path (in particular for 2D-surfaces). If the path indicated in FIG. 23 is selected in the xy-plane, then the y-value changes only once at each path change. For an inclined path as shown in FIG. 24, the y-value changes at each path point. A low resolution can therefore cause rounding errors at each path point in the x- and y-values. The consequences are illustrated in FIGS. 25 and 26. FIG. 25 is a point-by-point representation of the effects of an insufficient resolution on inclined paths FIG. 26 a corresponding line representation. The undesirable changes in curvature are clearly visible.

The following comparison shows the imprecision, in spite of linear paths:

| Case 1: paths extend along the x-axis | | Case 2: paths extend in the xy-plane within an angle of 30° | | | |
|---|---|---|---|---|---|
| | | | | Y in μm rounded to | |
| X in μm | Y in μm | X in μm | 1 μm | $10^{-4}$ μm | Dev. |
| 10 | 10 | 10 | 6 | 5.7735 | + |
| 20 | 10 | 20 | 12 | . . . | + |
| 30 | 10 | 30 | 17 | 11.547 | − |
| 40 | 10 | 40 | 23 | . . . | − |
| 50 | 10 | 50 | 29 | 17.320 | + |
| next path | next path | next path | next path | . . . | |
| | | | | 23.094 | + |
| 10 | 20 | 10 | 16 | . . . | + |
| 20 | 20 | 20 | 22 | 28.868 | − |
| 30 | 20 | 30 | 27 | . . . | − |
| 40 | 20 | 40 | 33 | next path | + |
| 50 | 20 | 50 | 39 | 15.773 | |
| | | | | . . . | |
| | | | | 21.547 | |
| | | | | . . . | |
| | | | | 27.320 | |
| | | | | . . . | |
| | | | | 33.094 | |
| | | | | . . . | |
| | | | | 38.868 | |
| | | | | . . . | |

The lower the resolution, the stronger the deviations for an inclined path. A path along the x-axis for a fixed y-value (see FIG. 23) is not influenced by this type of error (the path always remains a straight line). Paths parallel to a major axis are therefore preferred over inclined paths.

The influence of the resolution of the path can be described quite well with the help of normal vectors. A low resolution causes, in particular for inclined paths, more or less strong oscillations of the individual line segments about the ideal path. The normal vectors can therefore have geometrical position deviations from several degrees. This results in patches (clouds) of points when the normal vectors are rendered in a centered representation, as described above.

If the points are widely scattered, then this can represent a large deviation of the paths from an ideal path. Structures with hard contours (small point cloud, sharp line of points) indicates that there are no significant deviations and that a surface of good quality can be expected.

If the resolution of the input data is too low, then the deviations between the nominal data and actual data can be quite large. This directly impacts the direction of the normal vectors, which can again indicate the expected surface quality.

As described above, according to the invention characteristic features of the path can be recognized by vector quantities. The NC data are analyzed using these methods. Special features in the NC data can be used to recognize the connection between the expected surface quality.

Measuring the distances between points along the path can give an indication of path points that are too closely spaced. For a defined accuracy of, for example, 5 μm, distances of 1–4 μm between path are relatively insignificant and can result in large data sets or can negatively impact the machining operation (machining speed).

The computations are performed based on two consecutive data points in three-dimensions according to the formula:

$$s_{12}=|P_2-P_1|=\sqrt{(x_2-x_1)^2+(y_2-y_1)^2+(z_2-z_1)^2} \quad (9)$$

If the path points have a particularly close spacing, then a decision has to be made if and in which way to intervene. The following possibilities exist:

Simply delete the points
Perform an interpolation and a new scan with a greater spacing The aforedescribed methods of the invention can be used to recognize different properties of NC data. Weak points in the NC data can be visually represented in different ways and mathematically calculated. The visual methods are capable of 3-D rendition, i.e. there is no limitation with respect to different NC programs (2-D/3-D). Even complex models with millions of points can be analyzed quickly and efficiently, and weak points can be clearly displayed.

The identifiable weak points in the exemplary images are substantially overlapping the locations on the workpiece surfaces having an inadequate surface quality. Accordingly, there is an agreement between the irregularities determined with the methods of the invention and the surface quality of milled workpieces.

This association allows the following assumption:

a correction of the NC data, for example by smoothing methods, with the goal of decreasing known irregularities in the path (for example, continuously changing curvatures) should also have a positive impact on the surface quality of the workpieces.

After the NC programs have been analyzed, regions where, for example, the normal vectors have irregular directions and can influenced the surface of the workpieces, are determined. Therefore, approaches have to be found to change (for example, smooth) the NC data.

The NC data can basically be changed in two ways:

1. By changing the original data points
2. By generating new data points (changing the number of data points).

The approach 1. will be described in more detail. The approach 2. its based on the approach 1. and represents a kind of new scan of the path. Applying this approach, however, carries a high-risk of falsifying data (corner problems with the compensation spline).

A three-dimensional surface can fundamentally be represented by a set of points. Each point can hereby be represented by a value triplet (X, Y and Z values) in Cartesian space. If the points are connected by straight lines, then curves in space are produced.

An interesting special situation occurs if two identical parameters (e.g., X and Y) of all points are located in the same plane. The special situations can be described mathematically as follows:

$$P=(x,y,z);\ z=f(x,y) \quad (10)$$

This produces a situation wherein the milling paths in the xy-plane are straight lines than are parallel to one another (except for the edges). The straight lines do not have to be parallel to a particular axis, but can also be inclined in the plane. The corresponding x-y-values of the plane can be processed with two-dimensional algorithms. These value pairs can be smoothed, for example, by using comparatively simple linear solution trials.

An efficient way of smoothing straight lines in the plane is a linear regression. The x-y-values that jitter about a straight line in a plane are hereby forced onto a straight line. This can be used to smooth the X-Y-values of a value triplet (X, Y, Z).

Figure 27:
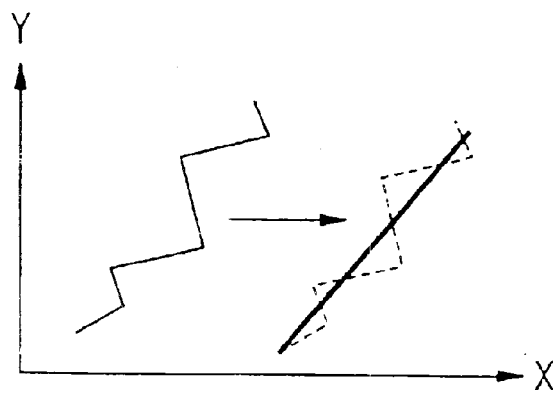
FIG. 27 shows an exemplary linear smoothing of path points.

If the cause for the non-linear path lies in the resolution of the data, then the resolution should be increased, since otherwise the obtained path will always be deficient and never be a straight line. FIG. 27 illustrates such linear smoothing.

Jitter errors that occur when scanning straight paths or linear paths with a low resolution can hereby be smoothed easily and without introducing additional parameters. This smoothing operation, however, is only suitable for data points where two coordinate values are located in one of the in three major planes and represent straight lines.

Moreover, methods for the compensation computation can also be applied to smoothing. This includes also the so-called splines. Paths and surfaces generated by splines require only a fraction of the data of a comparable approximation (segments of straight lines, triangles). The curves can also be easily changed by modifying only a few parameters (weights).

The advantage of the significantly reduced data volume is offset by an increased need for computing power to compute the interpolated values of the splines. For example, to represent a circle exactly, the circle has to be mathematically described. If the circle is approximated by points connected by straight lines, then depending on the resolution and the number of the points, a more or less ragged circle is obtained. In particular with enlargements, this approximation by line segments leads to noticeably ragged circles.

To render a smooth circle with a finite, high-resolution, a large number of points is required if the circle is approximated by line segments (otherwise the circle becomes ragged).

The quantity of data for complex models can easily reach several hundred MBytes. Only a few data points (support points) are required to represent a circle by splines. The interpolated values (intermediate values), however, have to be computed from the data points. The circle can be arbitrarily enlarged without requiring additional data points. The more interpolated values are required (e.g., due to the high-resolution), the longer the computing time (linearly increasing). The limit resolution of the spline curve is hence determined only by the size of the data format.

It is an object of a classical interpolation or approximation of curves to approximate a function $y=f(x)$ by a function $y=p(x)$. This is in general a polynomial of degree n. It is also required that the interpolated function p and the function f are identical at predetermined points (support points). The interpolation in an one-dimensional case for n points can then be solved with a polynomial of degree (n−1) according to:

$$y = p_{n-1} x^{n-1} + p_{n-2} x^{n-2} + \ldots + p_1 x + p_0 \tag{11}$$

Frequently, overshoots are observed at the support points. A polynomial spline $S(t)$ of degree m is defined by:

1. $S(t)$ is equal to the polynomial $p_\mu \in \Pi_m$, $m \in N$ in each interval $[\mu, \mu+1]$, $\mu \in Z$.
2. $S(t) \in C^{m-1} R$.

Three situations have to be distinguished:

Degree m=1: polygon
Degree m=2: quadratic spline
Degree m=3: cubic spline.

Splines have to satisfy certain boundary conditions. This requires agreement of the curve shape at the boundary between two adjacent intervals $[\mu-1, \mu]$ and $[\mu, \mu+1]$. Depending on the degree m of the spline, the derivatives have to be identical at the interval boundaries in addition to the function values of the spline. This is equivalent to the requirement that $S(t)$ can be continuously differentiated m-times.

In a physical sense, the first derivative represents the velocity. Different velocities are mostly undesirable, since unnecessary braking and acceleration maneuvers are required that can have negative implications for the surface quality of the milled path.

The same considerations also apply to the second derivative which physically corresponds to the acceleration. The boundary locations therefore have to satisfy the requirements:

$$y'_i = y'_{i+1} \text{ and } y''_i = y''_{i+1} \tag{12}$$

The X, Y and Z values of curves in three-dimensional space are rarely monotonous. Processing splines, however, requires a monotonous parameter. Three-dimensional paths are mostly not monotonous. To satisfy this condition, a monotonous relationship is provided by a parameterization:

$$P(t) = [x(t), y(t)] \tag{13}$$

Particularly helpful are three-dimensional cubic compensation splines. This type of spline has advantages over other types of splines in that it can form approximations. This method can also be easily applied in more dimensions, allowing smoothing of any parametric space curve.

Several aspects have to be observed when applying this method because the boundary conditions do not permit corners. The general form is:

$$\begin{pmatrix} S_x(t) \\ S_y(t) \\ S_z(t) \end{pmatrix} = \begin{pmatrix} S_{ix}(t) \\ S_{iy}(t) \\ S_{iz}(t) \end{pmatrix} \tag{14}$$

$$= \begin{pmatrix} a_{ix} + b_{ix}(t-t_i) + c_{ix}(t-t_i)^2 + d_{ix}(t-t_i)^3 \\ a_{iy} + b_{iy}(t-t_i) + c_{iy}(t-t_i)^2 + d_{iy}(t-t_i)^3 \\ a_{iz} + b_{iz}(t-t_i) + c_{iz}(t-t_i)^2 + d_{iz}(t-t_i)^3 \end{pmatrix}$$

$$\approx \begin{pmatrix} x(t) \\ y(t) \\ z(t) \end{pmatrix}$$

$$t_0 = 0, t_{i+1} = t_i + \sqrt{(x_{i+1} - x_i)^2 + (u_{i+1} - u_i)^2 + (v_{i+1} - v_i)^2}$$

The compensation splines can be used to smooth arbitrary curve shapes. By selecting the weights, a spline curve with the following properties can be generated:

Weight→∞
Compensation spline behaves like a cubic spline
Weight>0 and <∞
Compensation spline forms an approximation, depending on the weight
Weight→0
Compensation spline degenerates to a compensation line (Gauβ)

The degree of the interpolation is fixed by a weighting parameter (weight) for each support point. Greater weighting parameters result in a closer fit between the splines and the support point(s). A weighting parameter approaching 0 produces a compensation line.

The points of the input data serve as support points for the spline. Accordingly, the spline can be represented in two ways:

Only those data points that correspond to support points are indicated

The spline curve is obtained through interpolation between the support points.

The compensation splines are used primarily to change the original points in such a way (approximation of the support points towards a smooth spline curve), so that the path is smoothed while
simultaneously maintaining the curve shape of the path as much as possible.

Figure 28:
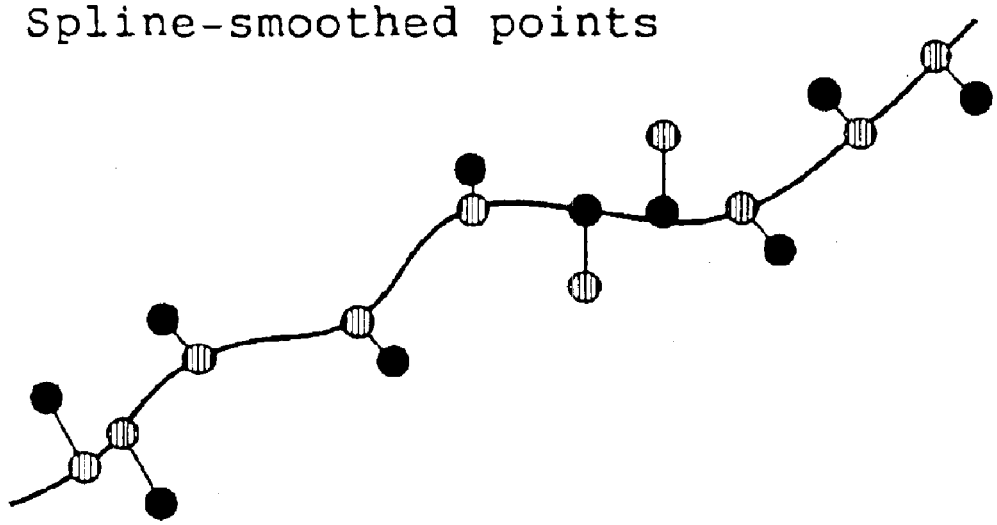
FIG. 28 shows an example of a spline curve resulting in smoothed points.

FIG. 28 shows an example of a spline curve and the points smoothed with the spline curve.

Compensation splines are continuous in $C^2$ (can be continuously differentiated twice) and do not produce corners. However, the magnitude of the problem is reduced since not the entire spline curve, but only the spline values at the support points (original points) are required. Unfortunately, the corner point can still deviate more than permitted from the original point (in particular for small weights).

The large deviations at the corners can be ameliorated in the following way:

1. By strongly increasing locally the weight of the support point (corner point)
2. By subdividing the compensation spline into several adjacent splines (e.g., from one corner point to the next, etc.)

For strongly smoothing splines, 1 and 2 can be combined. This advantageously preserves completely the corner values and also reduces the size of the splines.

Since the compensation spline can likewise also smooth in three dimensions, a two-dimensional smoothing algorithm is less important. However, the two-dimensional approach is identical, except for the third dimension.

Basically, a method is required that is capable of smoothing value triplets (X, Y, Z) for arbitrary curve shapes in three-dimensional space. Because of the aforementioned problems with splines, the path curve is smoothed only based on the support point values without considering intermediate values. Corners remain if the spline ends or begins there. The spline curve is only indicated at the support points, while a straight line is drawn between the points. This represents the spline-smoothed path curve.

To demonstrate the effectiveness of the smoothing algorithm, several real tests were performed. Two models were produced, one model with optimization, the other model without optimization. A comparison between the two models clearly demonstrates the effectiveness of the method of the invention. Based on the models, the smoothing parameters can be adapted for further improvement.

The essential features of the methods of the invention will now be briefly summarized.

Geometric View:

The three-dimensional view gives a first indication about the form of the workpiece based on the set of points. Line representations can be added to improve clarity and more clearly render the path curves.

Centered Normal Vector View:

After obtaining an initial overview, the centered normal vector view can be used to analyze the distribution of the normal vectors, which can be done either manually or automatically. These structures provide initial indications of the quality.

Overlay Normal Vectors:

In addition to the standard representation, the normal vectors can also be directly overlaid with the path curves which can then be used to determine local errors.

Pseudo-Surface:

A pseudo-surface can be generated based on the position of the normal vectors. Each path segment between two data points is illustrated in the direction of the first normal vector by a small surface segment. The normal vector represents one side of the surface and the line connecting the points the other side of the surface. The surface segments are rotated if the normal vectors of two adjacent path segments have very different directions. Surfaces with a different angular orientation have a different brightness for light reflection. These brightness variations quickly render irregularities in the NC program.

Concrete examples for implementing the invention using a software implementation in the programming language C++ that is based on freely accessible OpenGL routines for graphic rendering will now be described:

---

Point and line rendition using OpenGL code

```
void CGIsample1Doc::RenderScene_p(void)
{
    if (useVertexArrays)
    {
      glVertexPointer(3, GL_DOUBLE, 0, PS);
      glPushMatrix( );
          glRotated(phix,1,0,0);
          glRotated(phiy,0,1,0);
          glRotated(phiz,0,0,1);
          glTranslated( -Transl_Mitte_x, -Transl_Mitte_y, -Transl_Mitte_z);
          glColor3fv(pcolor);
          glDrawArrays(GL_POINTS, 0, maxPoint);
      glPopMatrix( );
    } else
```

-continued

```
    {
      glPushMatrix( );
        glRotated(phix,1,0,0);
        glRotated(phiy,0,1,0);
        glRotated(phiz,0,0,1);
        glTranslated( -Transl_Mitte_x, -Transl_Mitte_y, -Transl_Mitte_z);
        glBegin(GL_POINTS);
          glColor3fv(pcolor);
          for (long i=0;i<maxPoint;i++)
            glVertex3dv(PS[i]);
        glEnd( );
      glPopMatrix( );
    }
}
void CGIsample1Doc::RenderScene_l(void)
{
  if (useVertexArrays)
    {
      glVertexPointer(3, GL_DOUBLE, 0, PS);
      glPushMatrix( );
        glRotated(phix,1,0,0);
        glRotated(phiy,0,1,0);
        glRotated(phiz,0,0,1);
        glTranslated( -Transl_Mitte_x, -Transl_Mitte_y, -Transl_Mitte_z);
        glColor3f(0.5f, 0.5f, 0.5f);
        glDrawArrays(GL_LINE_STRIP, 0, maxPoint);
      glPopMatrix( );
    } else
    {
      glPushMatrix( );
        glRotated(phix,1,0,0);
        glRotated(phiy,0,1,0);
        glRotated(phiz,0,0,1);
        glTranslated( -Transl_Mitte_x, -Transl_Mitte_y, -Transl_Mitte_z);
        glBegin(GL_LINE_STRIP);
          glColor3f(0.5f, 0.5f, 0.5f);
          for (long i=0;i<maxPoint;i++)
            glVertex3dv(PS[i]);
        glEnd( );
      glPopMatrix( );
    }
}
```

Pseudo-surface rendition using OpenGL code

```
void CGIsample1Doc::RenderQuads(double* QP, double* QPN)
{
    glEnable(GL_LIGHTING);
    glEnable(GL_NORMALIZE);
    GLfloat WhiteSurface[] = { 0.5f, 0.5f, 0.5f, 1.0f};
    GLfloat LightAmbient[] = { 0.2f, 0.2f, 0.2f, 1.0f };
    glLightfv(GL_LIGHT0, GL_AMBIENT, LightAmbient);
    glEnable(GL_LIGHT0);
    glLightModeli(GL_LIGHT_MODEL_TWO_SIDE,(int)Light2side);
    if (useVertexArrays)
      {
        glVertexPointer(3, GL_DOUBLE, 0, QP);
        glEnableClientState(GL_NORMAL_ARRAY);
        glNormalPointer(GL_DOUBLE, 0, QPN);
        glMaterialfv(GL_FRONT_AND_BACK, GL_AMBIENT, WhiteSurface);
        glPushMatrix( );
          glRotated(phix,1,0,0);
          glRotated(phiy,0,1,0);
          glRotated(phiz,0,0,1);
          glTranslated( -Transl_Mitte_x, -Transl_Mitte_y, -Transl_Mitte_z);
          glDrawArrays(GL_QUADS, 0, (maxPoint-1)*4);
        glPopMatrix( );
        glDisableClientState(GL_NORMAL_ARRAY);
      }
      else
      {
        glMaterialfv(GL_FRONT_AND_BACK, GL_AMBIENT, WhiteSurface);
        glPushMatrix( );
          glRotated(phix,1,0,0);
          glRotated(phiy,0,1,0);
          glRotated(phiz,0,0,1);
          glTranslated( -Transl_Mitte_x, -Transl_Mitte_y, -Transl_Mitte_z);
          glBegin(GL_QUADS);
            for (long i=0; i<(maxPoint-1);i++)
```

```
            {
                glNormal3dv(QPN+12*i);
                glVertex3dv(QP +12*i);
                glVertex3dv(QP +12*i+3);
                glVertex3dv(QP +12*i+6);
                glVertex3dv(QP +12*i+9);
            }
        glEnd( );
    glPopMatrix( );
    }
    glLightModeli(GL_LIGHT_MODEL_TWO_SIDE, 0);
    glDisable(GL_LIGHT0);
    glDisable(GL_LIGHTING);
    glDisable(GL_NORMALIZE);
}
```

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A method for enhancing a surface quality of a workpiece to be machined by high-speed machining based on CNC program data before the workpiece is actually machined, the CNC program data including a set of points defining a surface in space, with the set of points including path points describing a space curve, said method performed by a program executed by a general purpose computer, the method comprising the steps of
   determining and rendering associated normal vectors for a plurality of adjacent path points by forming two vectors from three consecutive path points and arranging a normal vector of an intermediate path point of the three consecutive path points as a vector product perpendicular on a plane spanned by the two vectors, wherein an orientation of the normal vector with respect to a side of the plane is selected depending on a curvature of the space curve at the intermediate path point;
   indicating surface regions having a high surface quality by normal vectors pointing in a substantially identical direction;
   indicating surface regions having flaws by normal vectors pointing in different directions; and
   optimizing the surface quality is by manipulating CNC program data until at least a majority of normal vectors point in the same direction.

2. A method for enhancing a surface quality of a workpiece to be machined by high-speed machining based on CNC program data before the workpiece is actually machined the CNC program data including a set of points defining a surface in space with the set of points including path points describing a space curve, said method performed by a program executed by a general purpose computer, the method comprising the steps of
   determining and rendering associated normal vectors for a plurality of adjacent path points;
   indicating surface regions having a high surface quality by angle-bisecting vectors pointing in a substantially identical direction; and
   indicating surface regions having flaws by angle-bisecting vectors pointing in different directions,
   wherein an angle-bisecting vector is determined by forming two vectors from three consecutive path points and arranging a normal vector of an intermediate path point of the three consecutive path points as a vector product perpendicular on a plane spanned by the two vectors, and wherein the normal vector is rotated by an angle of 90° into the plane, so that the angle-bisecting vector is located at a half angle enclosed between the two vectors,
   wherein the surface is optimized by manipulating the CNC program data until at least a majority of angle-bisecting vectors point of the same direction.

3. The method of claim 1, and further comprising the steps of rendering all determined normal vectors of the path points so as to be centered at one point, determining a distribution of the rendered normal vectors, and indicating regions of high surface quality by substantially congruent normal vectors, while indicating flaws in a resulting surface by a scatter of the normal vectors pointing in different directions.

4. The method of claim 3, and further comprising the steps of normalizing the length of the normal vectors, and projecting the normalized normal vectors in three-dimensional space onto a spherical surface having a radius of the normalized normal vectors, whereby regions with flaws in the resulting surface of the workpiece are indicated by regions having a plurality of end points located on the spherical surface.

5. The method of claim 1, and further comprising the step of determining an angle between normal vectors of adjacent path points, wherein regions having a high surface quality are indicated by comparatively small angles between adjacent normal vectors, and flaws in a resulting surface of the workpiece are indicated by comparatively large angles and/or sudden changes of adjacent angles.

6. The method of claim 5, wherein a tolerance threshold value between 10° and 25° is selected, and wherein angles between adjacent normal vectors that are smaller than the tolerance threshold value are considered to be small angles and angles between adjacent normal vectors that are greater than the tolerance threshold value of considered to be large angles.

7. The method of claim 8, wherein the path points associated with adjacent normal vectors having a large angle are rendered with markings.

8. The method of claim 1, wherein a normal vector is rendered in form of an extended surface that extends from a path point to an adjacent path point on one or both sides of a path axis along the path.

9. The method of claim 1, wherein areas of the surface regions with flaws are marked by coloring at least one of points, lines and surfaces located in the areas.

10. The method of claim 1, wherein the CNC program data are manipulated by changing values of original data points.

11. The method of claim 1, wherein the CNC program data are manipulated by generating additional data points on the space curve.

12. The method of claim 10, and further including changing the original data points by smoothing.

13. The method of claim 12, wherein smoothing the original data points includes applying a linear regression that includes several adjacent path points, as long as the path can be reduced to at least one plane.

14. The method of claim 12, wherein smoothing the original data points includes applying a two-dimensional compensation spline extending over several adjacent path points, as long as the path can be reduced to at least one plane.

15. The method of claim 12, wherein smoothing the original data points includes applying a three-dimensional compensation spline extending over several adjacent path points.

16. The method of claim 12, and further including increasing a data resolution of the path points on the space curve.

17. The method of claim 2, wherein the normal vector is rendered in form of an extended surface that extends from a path point to an adjacent path point on one or both sides of a path axis along the path.

18. The method of claim 2, wherein areas of the surface regions with flaws are marked by coloring at least one of points, lines and surfaces located in the areas.

19. The method of claim 3, wherein the CNC program data are manipulated by changing values of original data points.

20. The method of claim 3, wherein the CNC program data are manipulated by generating additional data points on the space curve.

21. The method of claim 19, and further including changing the original data points by smoothing.

22. The method of claim 21, wherein smoothing the original data points includes applying a linear regression that includes several adjacent path points, as long as the path can be reduced to at least one plane.

23. The method of claim 21, wherein smoothing the original data points includes applying a two-dimensional compensation spline extending over several adjacent path points, as long as the path can be reduced to at least one plane.

24. The method of claim 21, wherein smoothing the original data points includes applying a three-dimensional compensation spline extending over several adjacent path points.

25. The method of claim 21, and further comprising the step of increasing a data resolution of the path points on the space curve.

* * * * *

UNITED STATES PATENT AND TRADEMARK OFFICE
CERTIFICATE OF CORRECTION

PATENT NO. : 6,832,128 B2  Page 1 of 1
DATED : December 14, 2004
INVENTOR(S) : Alexander Haupt It is certified that error appears in the above-identified patent and that said Letters Patent is hereby corrected as shown below:

Column 20,
Line 63, replace "8" with -- 6 --.

Signed and Sealed this

First Day of March, 2005

JON W. DUDAS
*Director of the United States Patent and Trademark Office*